United States Patent [19]
Warburton

[11] Patent Number: 4,544,098
[45] Date of Patent: Oct. 1, 1985

[54] COOLED EXHAUST NOZZLE FLAPS

[75] Inventor: Robert E. Warburton, Lake Park, Fla.

[73] Assignee: United Technologies Corporation, Hartford, Conn.

[21] Appl. No.: 453,186

[22] Filed: Dec. 27, 1982

[51] Int. Cl.$^4$ ............................................. B64C 15/06
[52] U.S. Cl. .......................... 239/127.3; 239/265.41
[58] Field of Search ............... 239/127.3, 127.1, 132.5, 239/265.17, 265.33, 265.37, 265.39, 265.41; 60/266, 265, 271

[56] References Cited

U.S. PATENT DOCUMENTS

| | | | |
|---|---|---|---|
| 4,071,194 | 1/1978 | Eckert et al. | 239/127.3 |
| 4,081,137 | 3/1978 | Sutton et al. | 239/127.3 |
| 4,093,157 | 6/1978 | Cavanagh, Jr. et al. | 239/127.3 |
| 4,098,076 | 7/1978 | Young et al. | 239/265.19 |
| 4,171,093 | 10/1979 | Honeycutt, Jr. et al. | 239/127.3 |
| 4,203,286 | 5/1980 | Warburton | 239/265.17 |

Primary Examiner—John J. Love
Assistant Examiner—Michael J. Forman
Attorney, Agent, or Firm—Stephen E. Revis

[57] ABSTRACT

Divergent flaps of an axisymmetric exhaust nozzle include a hot inner gas path wall spaced from an outer wall to define a cooling fluid channel therebetween along the length of the flap from the upstream end of the flap near the divergent nozzle throat to near the downstream end of the flap. A slot or other opening in the flap inner wall at or just downstream of the nozzle throat communicates with the upstream end of the channel. Openings in the flap outer wall near the downstream end of the flap provide communication between the channel and external ambient air at a higher pressure than the gas at the nozzle throat. Ambient air thus travels upstream through the channel, convectively cooling the hot inner wall and exits through the slot in the inner wall at or near the throat to film cool the gas path side of the inner wall.

10 Claims, 10 Drawing Figures

COOLED EXHAUST NOZZLE FLAPS

The Government has rights in this invention pursuant to Contract No. F33657-70-C-0600 awarded by the Department of the Air Force.

TECHNICAL FIELD

This invention relates to variable area exhaust nozzles such as for gas turbine engines, and more particularly to means for cooling the flaps thereof.

BACKGROUND ART

Exhaust nozzle flaps for gas turbine engines are typically cooled by a combination of film and convective cooling, such as shown in U.S. Pat. No. 4,081,137 to Sutton et al. Referring to FIG. 5 of that patent, a convergent/divergent exhaust nozzle is shown, both of which comprise flaps of "double walled" louvered construction. Cooling air is brought into the upstream ends of the convergent flaps and travels downstream between the hot gas path wall and a back wall wherein it convectively cools the hot wall. The cooling air, now somewhat warmer, is dumped into the gas path through slots in the hot wall at various locations along the length of the convergent flaps and film cools downstream portions of the flaps. The film cooling air from the convergent flaps passes into the throat of the divergent nozzle thereby providing additional film cooling of the divergent nozzle flaps. As shown in FIG. 14 of Sutton et al, some of the cooling air flowing within passageways of the divergent nozzle flaps is redirected by suitable duct means into coolant channels within adjacent seal flaps to cool the seal flaps.

One drawback of the cooling concept described in the above-mentioned patent is that the cooling air is coolest when it enters the upstream end of the flaps and becomes hotter as it travels downstream. Yet, the downstream ends of the divergent flaps are the hottest due to lower efficiency cooling. Thus, high temperature gradients may exist from the upstream to downstream ends of the divergent nozzle flaps, particularly during afterburning, creating stresses which can reduce life expectancy of the nozzle.

U.S. Pat. No. 4,203,286 to R. E. Warburton describes another exhaust nozzle cooling arrangement. Referring to FIG. 3 thereof, hollow convergent flaps include coolant channels extending along their length. Coolant enters the channels through inlets in the upstream ends of the flaps, and coolant exits the channels into the gas path through outlets in the downstream ends of the hot inner walls. The coolant leaving these outlets is directed into the throat of a downstream divergent nozzle to film cool the divergent nozzle flaps. Seal flaps disposed between adjacent convergent nozzle flaps may cover the coolant outlets in the convergent flaps depending upon the position of the nozzle. The outlets are uncovered when the nozzle is in its maximum open position to permit maximum coolant flow to the divergent nozzle. As the convergent nozzle closes, the seals cover more and more of the coolant outlets to reduce the coolant flow to the divergent nozzle.

U.S. Pat. No. 4,098,076 to J. H. Young et al describes a single flap two dimensional exhaust nozzle wherein coolant air from upstream (either ram air or fan air) is brought into the upstream ends of compartments within hollow flaps. The cooling air passes through various pressure reducer valves and is directed into various compartments (at different pressures for pressure balancing) within the nozzle flap. The reduced pressure cooling air in at least one compartment is redirected upstream between the double walls of a gas path face sheet, and is ejected into the gas path through a slot to film cool the flap, as shown in FIG. 3 thereof.

Of general interest as regards the state of the art of cooling nozzle flaps and seals is U.S. Pat. No. 4,171,093 to F. L. Honeycutt, Jr. et al.

DISCLOSURE OF INVENTION

One object of the present invention is an axisymmetric divergent exhaust nozzle having improved flap cooling means.

A further object of the present invention is an axisymmetric divergent exhaust nozzle constructed and arranged to provide maximum cooling at the downstream ends of the seal flaps where temperatures are hottest.

Yet another object of the present invention is to cool the flaps of a divergent exhaust nozzle in a manner resulting in minimum performance penalties to the engine.

Accordingly, in a variable area axisymmetric exhaust nozzle, nozzle flaps constructed in accordance with the present invention each include a hot gas path wall and an outer wall defining a cooling fluid channel therebetween along substantially the flap's full length, wherein the hot wall has a first opening into the channel at or immediately downstream of the nozzle throat, and the outer wall has at least one second opening communicating with the said cooling fluid channel near the downstream or exit end of the flap, wherein the second openings in the outer wall also communicate with cooling fluid external of the flap at a pressure greater than the gas stream pressure at the first opening in the hot wall such that cooling fluid flows through the cooling channel from the downstream end of the flap to the upstream end of the flap, convectively cooling substantially the full length of the hot wall and exiting through the opening in the hot wall near the throat to provide film cooling of the flap.

The present invention takes advantage of the lower than ambient air pressure at and immediately downstream of the nozzle throat during low nozzle pressure ratios of operation (and also during most other operating modes). Thus, the back sides of the flaps need only be exposed to ambient air to result in external cooling fluid flowing into the openings in the outer wall, traveling upstream through the channels in the flaps, and thereby convectively cooling the hot wall of the flaps. The cooling air exits from the channels into the gas stream at the opening in each flap near the throat and travels downstream along each flap to provide additional film cooling thereof. The convective cooling of the flaps is thus accomplished using cooling fluid which has not been previously heated and which has not been drawn from the engine flow path. "Ambient air" as herein used is defined as air at conditions of pressure and temperature similar to or the same as that of the air surrounding the engine at sea level or at altitude, as the case may be. In other words, it is air at conditions of pressure and temperature which are substantially the same as that of the air entering the engine.

To maximize cooling effectiveness the openings in the outer wall are located and sized so as to direct columns of cooling air at a sharp angle (preferably perpendicularly) against the rear side of the hot front wall to provide impingement cooling of that wall. Impingement cooling is the most effective method of cooling. Convective cooling, such as occurs as the cooling fluid flows through the channel behind the hot inner wall is less effective than impingement cooling; and film cooling is less effective than either convective or impingement cooling.

In some engines, under certain conditions usually associated with high nozzle pressure ratios the gas stream pressure at the nozzle throat adjacent the flap may be higher than ambient air pressure. In that situation, a portion of coolant fluid entering the divergent nozzle from upstream thereof, such as air which has been used to cool upstream convergent nozzle flaps, is drawn into the openings in the inner walls of the flaps near the throat and flows downstream through each flap cooling channel to convectively cool the flaps, and exits through the openings in the outer walls. That portion of the cooling fluid which is not drawn into the channels continues downstream to film cool the flaps. The result is improved cooling of the flaps as compared to 100% film cooling since, as mentioned above, convective cooling is more effective than film cooling.

The foregoing and other objects, features and advantages of the present invention will become more apparent in the light of the following detailed description of preferred embodiments thereof as shown in the accompanying drawing.

BEST MODE FOR CARRYING OUT THE INVENTION

Figure 1:
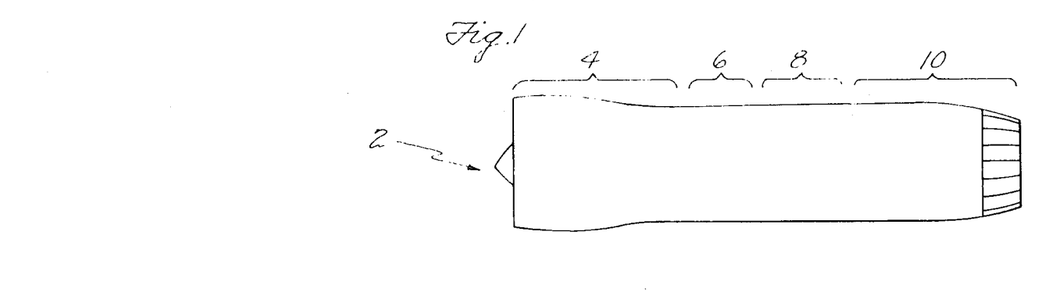
FIG. 1 is a view of a gas turbine engine incorporating the present invention.

Referring to FIG. 1, an engine 2 incorporating the features of the present invention includes a compressor section 4, a burner section 6, a turbine section 8, and an exhaust duct and exhaust nozzle section 10. Within the exhaust duct, but not shown in the drawing, are spray rings and flameholders for afterburning.

Figure 2A:
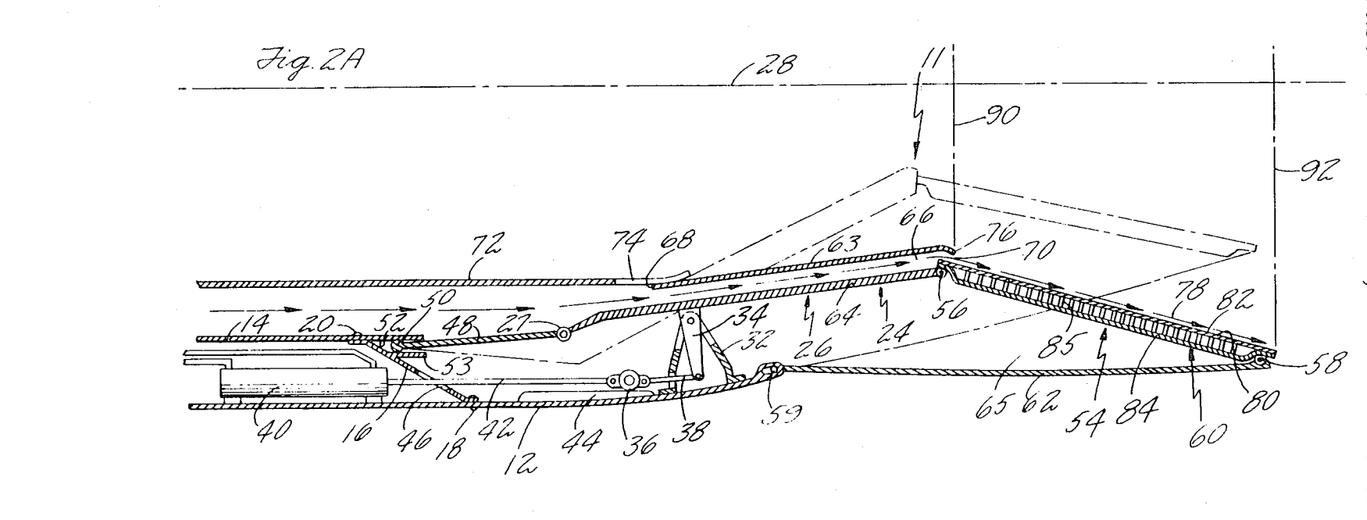
FIG. 2A is a simplified cross-sectional view taken through the main flaps of the exhaust nozzle and rear portion of the engine of FIG. 1.

In the exemplary embodiment of FIG. 2A the exhaust nozzle, its actuation system and supporting structure is shown in cross section. The exhaust nozzle is a variable area, axisymmetric convergent/divergent nozzle generally represented by the reference numeral 11 and shown in its maximum open or afterburning position. The fully closed position of the exhaust nozzle is shown in phantom. As regards the supporting structure, an engine inner case 14 is fixed to outer housing structure 12 by a conical shaped connecting member 16. This member is attached to the outer housing by bolts 18 and extends radially inwardly and forwardly to a point where it is connected to the inner casing, such as by bolts 20, forming a section of a cone.

The convergent nozzle portion of the convergent/divergent exhaust nozzle 11 is generally represented by the reference numeral 24 and is comprised of a plurality of axially extending main convergent flaps (alternating with convergent seal flaps 100 shown in FIG. 2B) circumferentially disposed about the engine axis 28. These main flaps are each pivotally mounted on a bracket member 32 which extends inwardly from the rearward end of the structure 12. An actuating arm 34 extends outwardly from each main flap 26, and movement of the arm actuates the attached main flap 26 about its pivotal mounting. Each main flap 26 is pivotally mounted at a desired balance point. In one nozzle design, and as shown in the drawing, this location was made approximately one-third of the distance from the flap's forward edge 27.

So that all of the main flaps 26 are moved in unison, the free end of each of the arms 34 is connected to a unison ring 36 by a connecting link 38. A plurality of actuators 40 are mounted in the space between the housing structure 12 and the inner case 14 in front of the conical connecting member 16. An actuating rod 42 extends from each of the actuators 40 and is attached to the unison ring 36. The unison ring 36 is centered within and slides on track members 44 spaced around the outer housing structure 12. Each actuating rod 42 extends through an opening 46 in the connecting member 16.

A plurality of balance flaps 48 extend forwardly of the main flaps 26. Each balance flap 48 has its rearward end pivotally connected to the forward edge 27 of a main flap 26, while its forward end has cylindrical means 50 thereon which is mounted for axial movement in a track means 52. Each track means 52 is formed between a rearward extension of the inner case 14 and a rearwardly extending flange 53 on the connecting member 16.

The divergent nozzle, generally represented by the reference numeral 54, comprises a plurality of axially extending main divergent flaps 60 (which alternate with divergent seal flaps 98 shown in FIG. 2B) circumferentially spaced about the engine axis 28. The exhaust nozzle throat is approximately in the plane 90 of the forward end of the divergent flaps 60. The exhaust nozzle exit is in the plane 92 of the rearward end of the flaps 60.

There are an equal number of convergent and divergent flaps. Each main divergent flap 60 has its forward end pivotally connected to the rearward end of a main convergent flap 26, as at 56, while its rearward end is pivotally connected, as at 58, to the rear end of an external flap 62. Each external flap 62 has its forward end pivotally mounted to the rear end of the housing structure 12, as at 59, just rearward of the bracket member 32. The convergent, divergent and external flaps, along with engine structure define a nonpressurized, ambient air compartment 65.

The main convergent flaps 26 each include a liner 63 attached to an outer wall 64. The liner 63 and outer wall 64 are spaced apart (by suitable supporting structure, not shown) defining axially extending channels 66 therebetween. The channels 66 have an inlet end 68 and an outlet end 70. An inner liner 72 is positioned around and fixedly spaced radially inwardly the inner case 14. Circumferentially spaced resilient fingers 74 extend rearwardly from the end of the inner liner 72 and contact the inner surface of the main convergent flap liner 63. Coolant flow from between the inner liner 72 and inner case 14 enters the channels 66 at their inlets 68 and travels downstream thereby convectively cooling the liner 63. The coolant leaves the channels 66 via the outlet end 70, and the curved liner end 76 directs a film of coolant air, represented by the arrows 78, over the hot inner surface 80 of the divergent flaps 60. Other means for bringing cooling fluid into heat exchange relation with the liner 63 for either film or convective cooling thereof, and other means for directing that cooling air flow into the throat of the nozzle are well known in the art and could be used in place of the structure shown in the drawing. For example, see hereinabove referred to U.S. Pat. No. 4,081,137.

In this embodiment the main divergent flaps 60 include spaced apart inner and outer walls 82, 84, respectively. The flaps 60 are reinforced with a honeycomb structure 85 disposed between the walls. No coolant flows between the walls 82, 84. Thus, the main flaps 60 are cooled solely by film cooling.

Figure 2B:
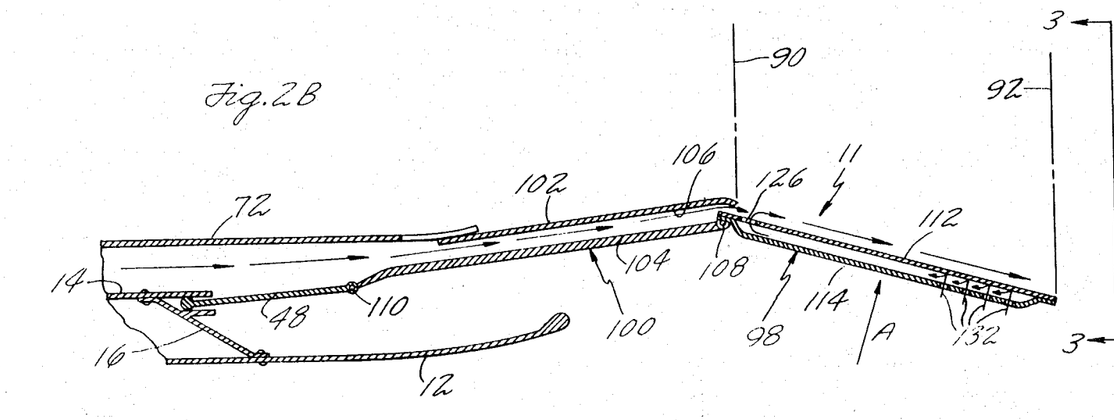
FIG. 2B is a simplified cross-sectional view taken through the seal flaps of the exhaust nozzle and rear portion of the engine of FIG. 1.

FIG. 2B is a section similar to that of FIG. 2A but taken through the convergent and divergent seal flaps 100, 98, respectively of the nozzle 11. Referring first to the convergent nozzle 24, the seal flaps are generally represented by the reference numeral 100. For purposes of explanation, and because the precise construction of the convergent flaps are not critical to the present invention, the convergent seal flaps 100 are shown as being similar in construction to the convergent main flaps 26. Thus, each convergent seal flap 100 comprises a liner 102 spaced apart from an outer wall 104, wherein an axially extending coolant channel 106 is defined therebetween. The rear end of each convergent seal flap 100 is pivotally connected, as at 108, to the forward end of a corresponding divergent seal flap 98; and the forward end of each convergent seal flap 100 is pivotally connected as at 110 to the rearward end of a balance flap 48. The convergent seal flaps 100 are not directly actuated as are the main convergent flaps 26. The axially extending side edges of the convergent seal flaps slide against and are supported by the adjacent main flaps as the main flaps are actuated, thereby sealing the spaces therebetween. The convergent main flaps and seal flaps may, for example, be constructed and arranged as shown in above-referred to U.S. Pat. No. 3,972,475. Alternatively they could be constructed in accordance with commonly owned U.S. Pat. No. 3,979,065. Synchronizing the movement of the convergent flaps and convergent seals may be accomplished by means of the apparatus shown and described in commonly owned U.S. Pat. No. 3,730,436.

Figure 3:
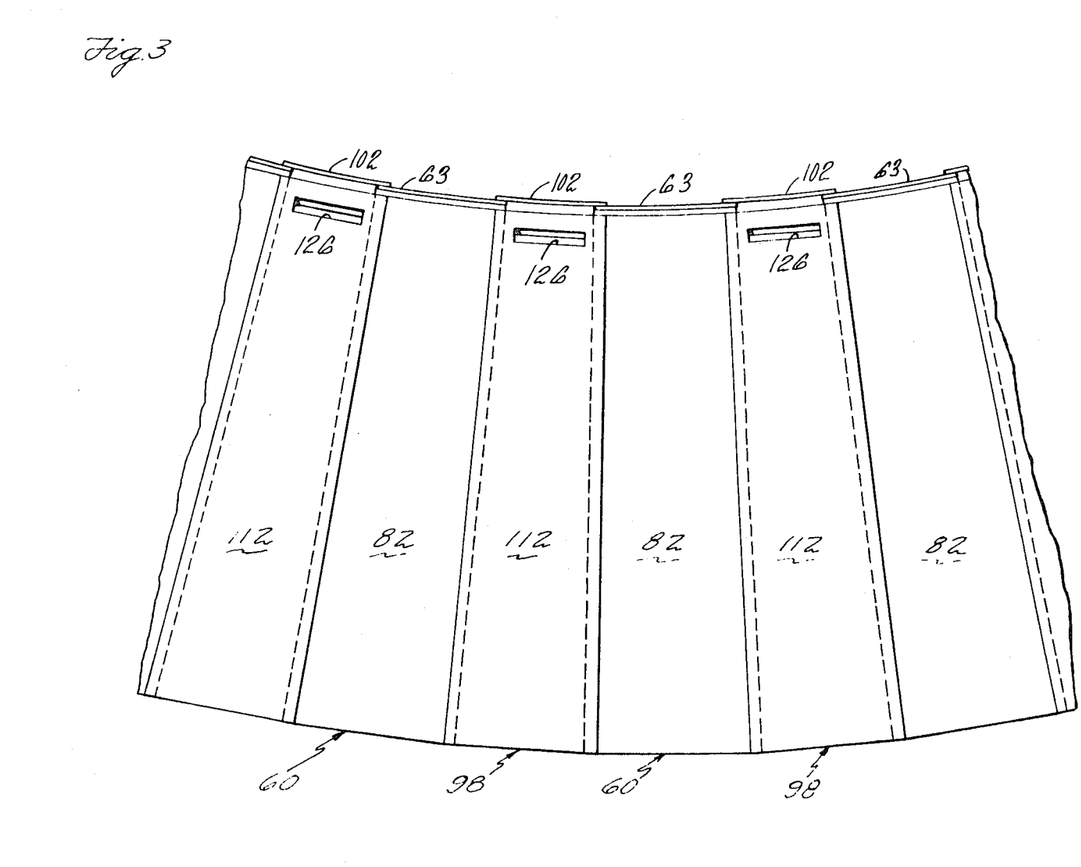
FIG. 3 is a view taken in the direction 3—3 of FIG. 2 looking up the engine tail pipe.
Figure 4:
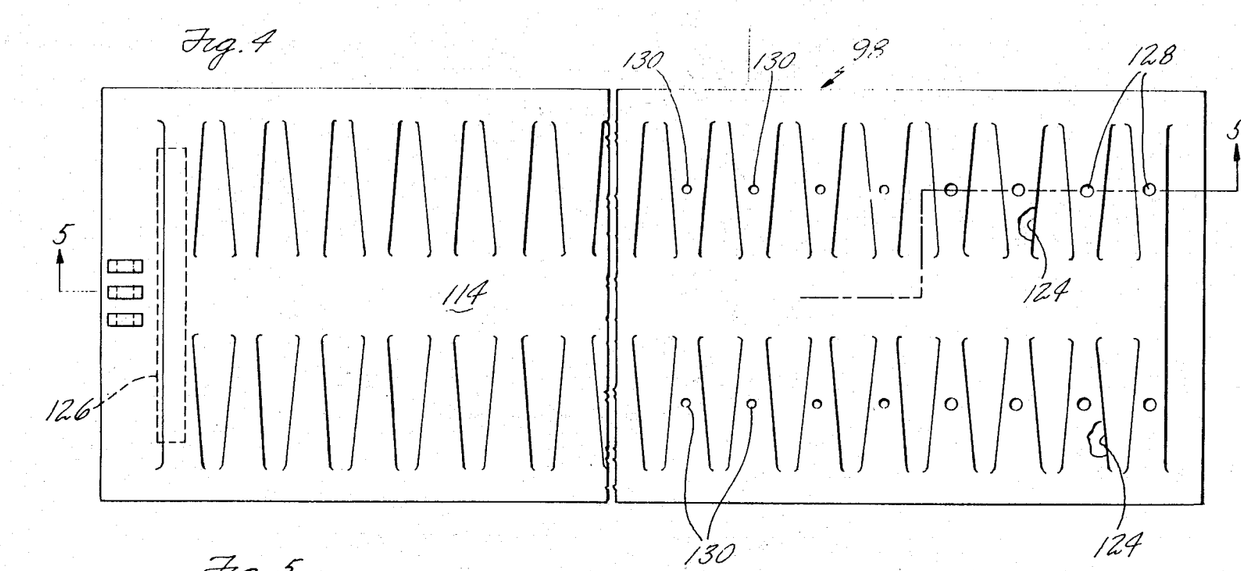
FIG. 4 is a view taken in the direction A of FIG. 2 showing the outer side of a seal flap of the divergent portion of the nozzle with adjacent flaps omitted for clarity.
Figure 5:
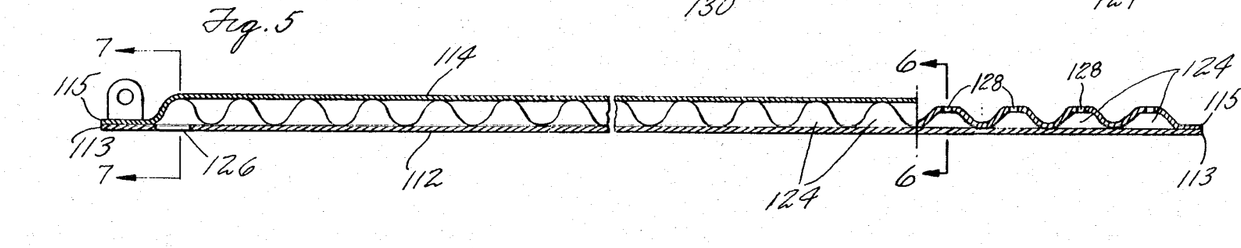
FIG. 5 is a cross-sectional view taken along the line 5—5 of FIG. 4.

In this preferred embodiment the cooling concepts of the present invention are applied to the divergent seal flaps 98, although it will become apparent that the divergent main flaps 60, which overlap the seal flaps, could also be reconfigured to incorporate the features of the present invention. Thus, the features of the present invention may be applied to either or both the seal and main flaps of a divergent exhaust nozzle. The overlapping relationship of the divergent main and seal flaps can readily be seen in FIG. 3, as well as in FIGS. 6 and 7 to be discussed hereinbelow.

Referring to FIGS. 4–7 as well as to FIG. 2B, the seal flaps 98 each comprise a hot inner or front wall 112 and an outer or back wall 114. Axially extending side edges 116, 118, of the walls 112, 114, respectively (FIG. 6 and FIG. 7), as well as end edges 113, 115 (FIG. 5), are joined together by suitable means, such as by welding. The inner and outer walls 112, 114, respectively, are spaced apart for substantially the full length of the seal flap 98 along a central band 120 of the seal flap defining a clear channel 122 substantially rectangular in cross section transverse to the length of the flap. While the inner wall 112 is substantially flat along its entire length so as to form a smooth gas flow path wall portion, the outer wall 114 is corrugated along both sides of the channel 122 to form a plurality of passageways 124 communicating with the channel 122 and extending transverse to the length of the channel 122 on both sides thereof along the channel's full length. The passageways 124 communicate with the channel 122, reaching substantially to the side edges 116 of the flap. In addition to forming the transverse passageways 124, the corrugations provide structural strength to the seal flap 98.

Figure 6A:
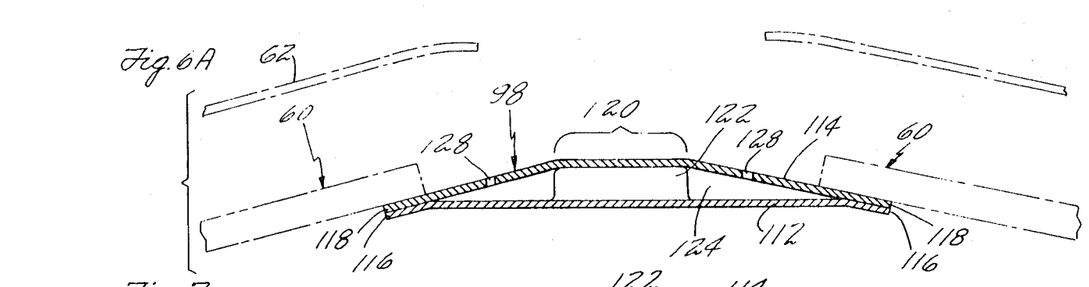
FIGS. 6A and 6B are cross-sectional views of the seal flap taken along the line 6—6 of FIG. 5 and which show, in phantom, the main flaps disposed on either side of the seal flap in fully open (FIG. 6A) and fully closed (FIG. 6B) nozzle positions.
Figure 6B:
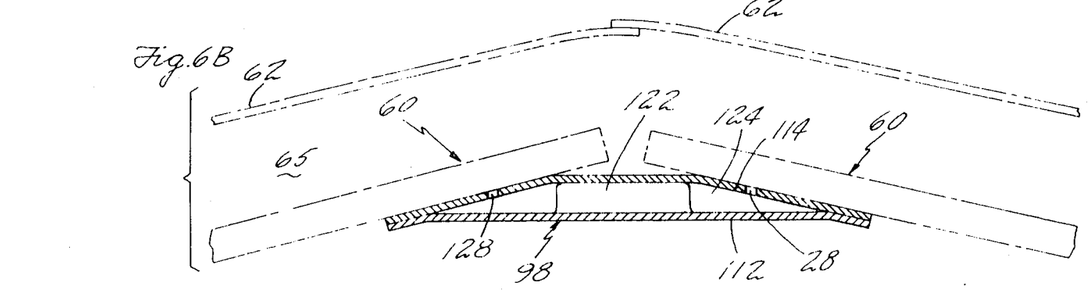
Figure 7:
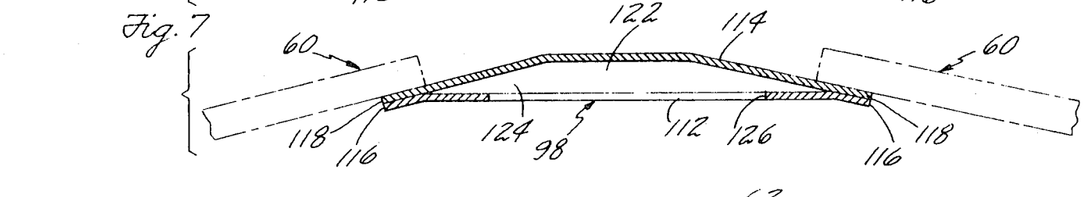
FIG. 7 is a cross-sectional view of the seal flap taken along the line 7—7 of FIG. 5.

In accordance with the present invention, the hot inner gas path wall 112 of the seal flap 98 has a slot 126 therethrough opening into the forward end of the channel 122. The slot 126 extends transversely across almost the full width of the flap and is located axially immediately downstream of the nozzle throat plane 90. The outer seal flap wall 114 has a plurality of first openings 128 therethrough into several of the passageways 124 furthest downstream, and smaller second openings 130 just upstream thereof communicating with several other passageways 124. The openings 128, 130, and thus the channel 122, communicate with the ambient air compartment 65 (FIG. 2A) when the nozzle 11 is in its maximum open position (FIG. 6A). As shown in FIG. 6B, the openings 128, 130 are blocked or closed off by the adjacent main flaps 60 when the nozzle 11 is closed. It is not required, as part of the present invention that all or even any of the openings in the outer wall 114 be blocked at any position of the nozzle 11. Cooling requirements are, however, usually minimal at low power nozzle positions when the nozzle is closed; but it may improve performance slightly by providing cooling air flow through the flaps in those instances.

Figure 8:
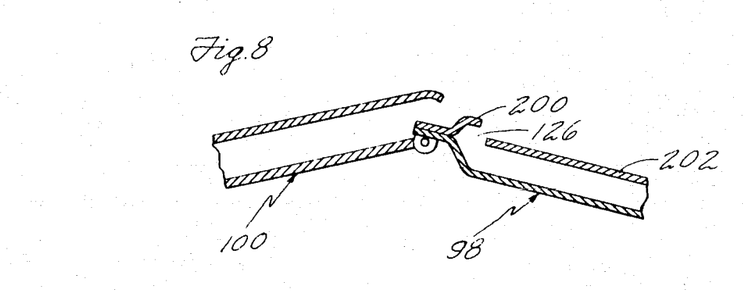
FIG. 8 is a view of an alternate embodiment of the seal flap of the present invention.

In most of the engine flight regime the gas pressure at the nozzle wall at or immediately downstream of the throat is significantly less than ambient air pressure, such as the ambient air pressure in the compartment 65 behind the convergent, main and seal flaps 60, 98, respectively. Thus, when the openings 128, 130, are not blocked, the usual situation will be that ambient air flows into the openings 128, 130, is fed to the channel 122 via the passageways 124, and travels upstream through the channel 122 exiting into the gas path through the slot 126 in the seal inner wall 112. As shown in the alternate embodiment of FIG. 8, the seal flap 98 may include, but may not require, a louver 200 to help direct fluid flow from the slot 126 downstream over the inwardly facing surface 202 of the inner wall. Note, also, that although a rectangular slot 126 traverse to the flap length is preferred, other openings may be used, such as an array of holes.

Since the lowest pressure in the gas stream will be at the throat of the nozzle, and since pressure increases in the downstream direction, it is therefore preferred to locate the slot 126 at the throat or as close to the throat (but downstream thereof) as is physically possible to maximize the cooling fluid flow rate through the channel 122.

Preferably, and as shown herein, the openings 128, 130 are positioned and shaped to direct a high velocity stream of cooling air at a sharp angle against the inside surface of the inner wall 112 to effect impingement cooling thereof, as depicted by the arrows 132 in FIG. 2B. Maximum cooling occurs in those areas, and is desirable since the hottest gas temperatures are seen at and near the downstream or exit end of the divergent nozzle.

After impingement cooling the downstream portion of the seal flaps 98, the air travels through the channel 122 and convectively cools the length of inner wall 112. After exiting into the gas path through the slot 126 it provides film cooling to the seal flap in addition to the film cooling already provided by the cooling air dumped into the nozzle throat from within the convergent seal flaps 100. This relatively cool air being dumped into the nozzle flow path provides a benefit in addition to cooling in that it energizes the low pressure region just aft of the throat with higher pressure ambient air.

Another feature of the present invention is that the amount of cooling along the length of the flap may be tailored toward a goal of uniformity from the downstream to upstream end thereof by placement and sizing of the openings in the outer wall 114. This is particularly useful in reducing the temperature gradient along the axial length of the flap. In the present embodiment the axial temperature gradient as well as the maximum flap temperatures were reduced by using larger openings 130 nearest the downstream end, smaller openings 128 for a distance upstream thereof, and no openings in the forward half of the seal flap outer wall 114.

In one test of a convergent/divergent nozzle having divergent seal flaps about 4½ inches wide and 20½ inches long constructed like the seal flap shown in the drawing (FIGS. 4–7), a maximum seal flap temperature of 1635° F. was reached during afterburning at a point about 17.5 inches aft of the nozzle throat. This compares to a maximum temperature of about 2019° F. reached during a test of a similarly constructed seal flap having no slot 126 or openings 128, 130 (i.e., solely film cooled using convergent flap cooling air). Also, the seal flap maximum axial temperature gradient was reduced from about 60° F./inch to about 30° F./inch. During the testing it was determined that the maximum quantity of cooling air flowing into the seal flaps was equivalent to only about one-quarter of 1% of the total engine air flow.

Yet another feature of the present invention is that improved cooling of the divergent seal flaps occurs even when the gas pressure in the gas path at the slot 126 is greater than ambient air pressure. In that case a small percentage of the cooling air entering the nozzle throat from the convergent nozzle flaps is sucked into the slots 126 and convectively cools the seal flaps as it travels downstream through the channels 122. This situation occurs at relatively high nozzle pressure ratios. In one test under such conditions it was determined that about 3% of the film cooling air flow entering the throat from upstream thereof was diverted into the slots 126. (Note: 3% of the film cooling air flow is equivalent to about one-quarter of 1% of the total engine air flow.)

Although the invention has been shown and described with respect to a preferred embodiment thereof, it should be understood by those skilled in the art that other various changes and omissions in the form and detail thereof may be made therein without departing from the spirit and the scope of the invention.

I claim:

1. A variable area axisymmetric exhaust nozzle having an axis, a throat, and an exit, and comprising a plurality of movable first flaps circumferentially disposed about said axis defining a diverging nozzle, each flap having an upstream end substantially at said throat and a downstream end substantially at said exit, at least every other one of said flaps being a cooled flap, said cooled flaps each including an inner wall forming a portion of a gas flow path through said nozzle and an outer wall disposed radially outwardly of said inner wall, said outer wall having a forward and rearward end portion, each of said cooled flaps having a cooling fluid channel defined between said inner and outer wall, said channel extending over substantially the full length of said cooled flap and having a forward end and rearward end, said inner wall of each of said cooled flaps having at least one first opening therethrough into said forward end of said channel at or immediately downstream of said throat, and said outer wall of each of said cooled flaps having at least one second opening through said rearward end portion thereof communicating with said rearward end of said channel, said second opening adapted to communicate with a supply of cooling fluid at a pressure greater than the fluid pressure in the gas flow path at said first opening under at least some nozzle operating conditions to cause said cooling fluid to enter said channel via said second opening and to exit said channel into said gas flow path via said first opening thereby convectively cooling said inner wall over substantially its entire length.

2. The exhaust nozzle according to claim 1 wherein said first flaps are alternately a main flap and a seal flap, each main flap including an inner wall, wherein at least said seal flaps are cooled flaps, said seal flaps each having axially extending side edges, said side edges of each of said seal flaps being in sliding, sealing relation to said inner wall of said main flaps.

3. The variable area exhaust nozzle according to claim 2 wherein in closed positions of said nozzle at least some of said second openings in said seal flaps are covered by said main flaps which prevent the flow of fluid therethrough.

4. The variable area exhaust nozzle according to claim 3 wherein all of said second openings in said seal flaps are covered by said main flaps when said nozzle is in its closed position to prevent flow through said channels.

5. The variable area exhaust nozzle according to claim 1 wherein said first opening in each of said cooled flaps is a slot extending transverse to the length of said cooled flap.

6. The variable area exhaust nozzle according to claim 5 wherein said cooled flap inner wall has a radially inwardly facing surface, and said cooled flap includes louver means to direct fluid flow from said slot downstream over said inwardly facing surface of said inner wall.

7. The variable area exhaust nozzle according to claim 1 including a plurality of second flaps circumferentially disposed about said axis defining a converging nozzle upstream of said diverging nozzle, said second flaps having downstream ends defining an exit end of said converging nozzle, said downstream ends of said second flaps being pivotally connected to said upstream ends of said first nozzle flaps, wherein said exhaust nozzle includes means for providing a flow of cooling fluid in heat exchange relation with said second flaps and for directing said cooling fluid, after it has cooled said second flaps, into said diverging nozzle at said throat.

8. The exhaust nozzle according to claim 1 wherein said outer walls of said cooled flaps each have a plurality of said second openings located and sized to direct streams of cooling fluid substantially perpendicularly against said inner walls to impingement cool said inner walls.

9. The exhaust nozzle according to claim 8 wherein said cooled flaps each include axially extending side edges, and the width of each channel is less than the width of its respective flap and is centered between said side edges, each channel having axially extending sides wherein each of said cooled flaps includes means defining a plurality of axially spaced apart passageways extending transverse to the length of said channel and extending outwardly to substantially said side edge of said flap from each side of said channel, said passageways being in fluid communication with said channel, wherein at least some of said second openings open into said passageways.

10. The exhaust nozzle according to claim 8 wherein said second openings are distributed over a portion of the length of said cooled flaps and are sized to admit the greatest amounts of coolant fluid nearest said downstream ends of said cooled flaps and the least amounts nearest said upstream ends of said cooled flaps to minimize the axial temperature gradient along said inner walls of said cooled flaps.

* * * * *